United States Patent [19]

Pundt

[11] 4,117,606
[45] Oct. 3, 1978

[54] METHOD AND MEANS OF SEQUENTIALLY OBSERVING PLAYER POSITIONS IN PREDETERMINED GAME PLAYS

[76] Inventor: Richard A. Pundt, 4110 Hickory Hill La., SE., Cedar Rapids, Iowa 52403

[21] Appl. No.: 818,284

[22] Filed: Jul. 22, 1977

[51] Int. Cl.² .............................................. A63F 7/06
[52] U.S. Cl. .................................. 35/29 R; 273/94 R
[58] Field of Search ......................... 35/29 R; 273/94

[56] References Cited

U.S. PATENT DOCUMENTS

| | | | |
|---|---|---|---|
| 2,049,284 | 7/1936 | Anderson | 273/94 X |
| 2,149,325 | 3/1939 | White | 35/29 R |
| 2,260,467 | 10/1941 | Le May | 273/94 |
| 3,547,441 | 12/1970 | Thornton | 273/94 |

*Primary Examiner*—Harland S. Skogquist
*Attorney, Agent, or Firm*—Zarley, McKee, Thomte, Voorhees & Sease

[57] ABSTRACT

A method comprising illuminating simulated positions of an offensive team and a defensive team, instituting a play by the offensive team by intermittently and sequentially changing the positions of the offensive and defensive teams through the progressive development of the play to its conclusion. An apparatus comprised of a support means, an offensive play sheet on said support means having a plurality of apertures showing optional sequential offensive and defensive positions of players through a given play, a defensive play sheet superimposed with respect to said offensive sheet, and similar to said offensive sheet and also showing some offensive and defensive positions, a master play sheet having apertures depicting a predetermined play sequence compatible with the apertures in said offensive and defensive sheets. Means are provided for moving the master sheet to various compatible positions with respect to the offensive and defensive sheets to show progressively the locations of offensive and defensive positions as the play develops, and a light source to enhance the visibility of aligned apertures in said three sheets.

9 Claims, 7 Drawing Figures

METHOD AND MEANS OF SEQUENTIALLY OBSERVING PLAYER POSITIONS IN PREDETERMINED GAME PLAYS

BACKGROUND OF THE INVENTION

A need exists for permitting the sequential analysis of player positions as play in a given game evolves. This is particularly true for football as various offensive and defensive formations are used. The need for such a system is important for coaching, teaching, research and even recreation. Existing devices are primarily recreational in nature and do not afford an opportunity to have a game play materialize sequentially whereby the changing positions of the players can be sequentially monitored.

This invention allows the offense and defense to be assembled according to actual game conditions. The defensive and offensive sheet can accommodate different results on a given play, with the final course of the play being determined by the master sheet.

In addition to the recreational value of the present invention, specific game situations can be programmed by the selection of various offensive, defensive and master sheets so that teaching, coaching and research can be conducted as each play is sequentially evolved and observed. While a mechanical apparatus is disclosed, the same concept of this invention can be employed in an electronic network without departing from the invention.

DESCRIPTION OF THE DRAWINGS

This invention consists in the construction, arrangements and combination of the various parts of the device, whereby the objects contemplated are attained as hereinafter more fully set forth, specifically pointed out in the claims and illustrated in the accompanying drawings in which:

DESCRIPTION OF THE PREFERRED EMBODIMENT

The numeral 10 generally designates a supporting structure comprised of side sections 12 which support plate 14 by posts 16. Plate 14 represents the playing field which has appropriate yard lines imposed thereon.

Figure 1:
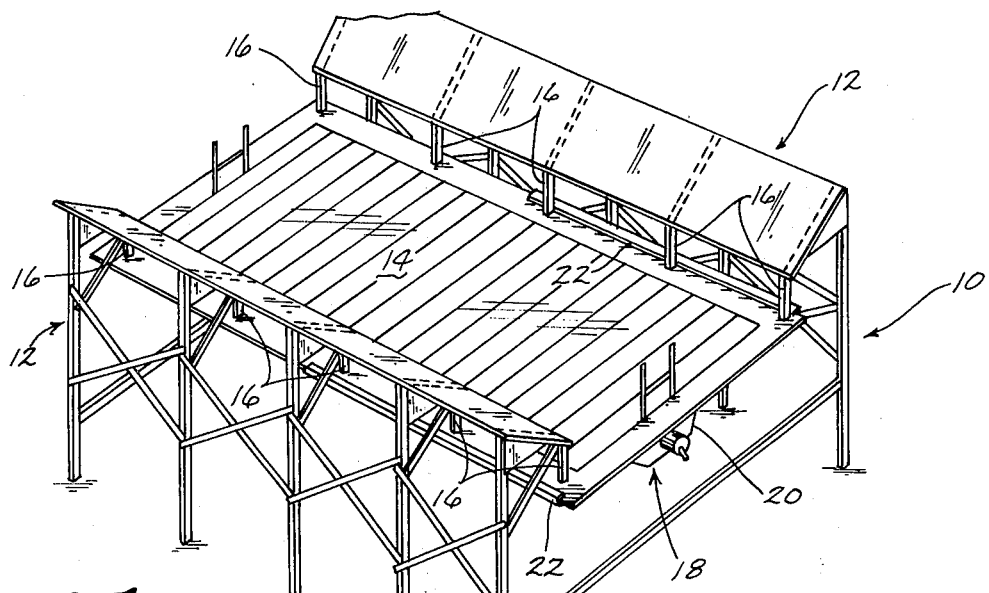
FIG. 1 is a perspective view of a device upon which the method of this invention can be practiced wherein the game of football is contemplated.
Figure 2:
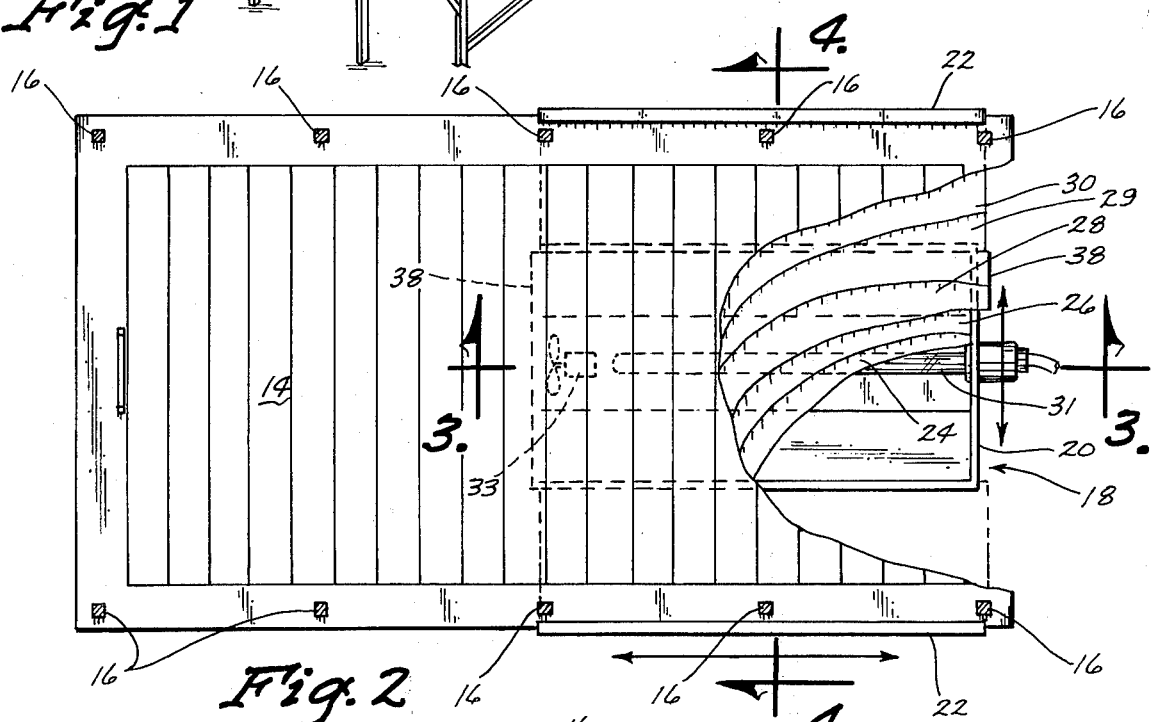
FIG. 2 is a plan view thereof with positions broken away to more fully illustrate its construction.
Figure 3:
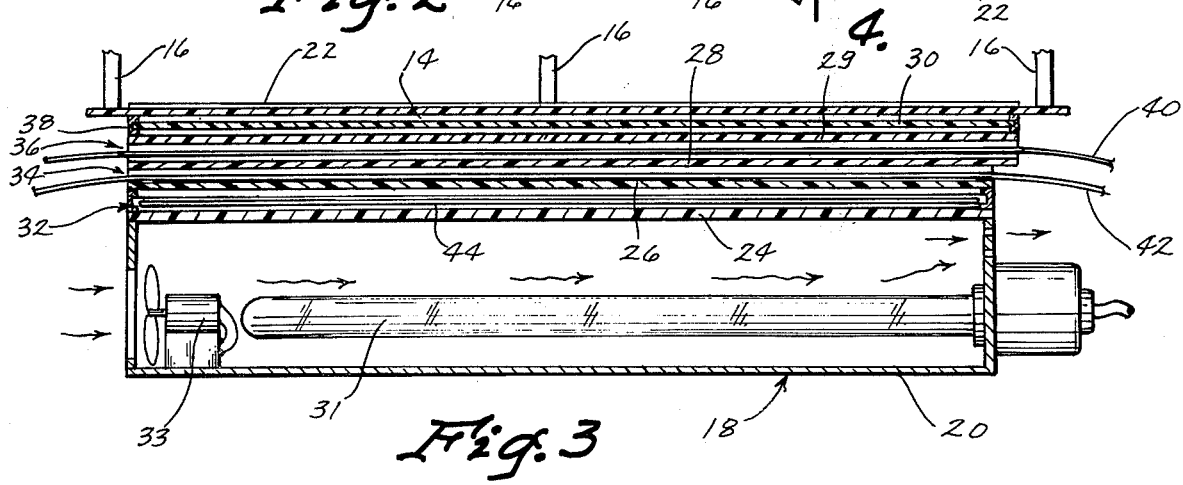
FIG. 3 is an enlarged scale sectional view taken on line 3—3 of FIG. 2.
Figure 4:
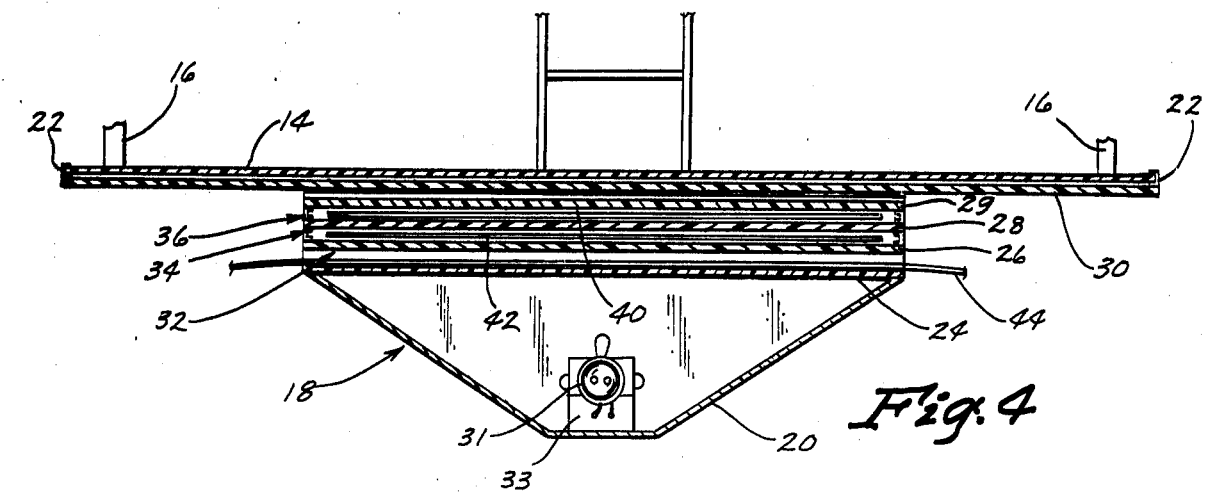
FIG. 4 is a sectional view taken along line 4—4 of FIG. 2.

Sub-structure 18 comprises compartment 20 and channel shaped side rails 22 which slidably embrace the opposite side edges of a translucent plate 14. The upper portion of sub-structure 18 is comprised of a plurality of spaced-apart plates 24, 26, 28, 29 and 30, which create open-ended slots 32, 34, and 36 (FIG. 4). Channel-shaped rails 38 (FIG. 3) are secured to the end edges of plate 28 to permit the structure therebelow to be slid in a lateral direction with respect to plate 30. Rails 22 are secured to the side edges of plate 30 to permit the entire sub-structure 18 to be slid longitudinally to the side edges of plate 14. A light element 31 and cooling fan 33 are mounted within compartment 20 and are connected to a source of energy.

Compartments or slots 34 and 36 are adapted to receive one each of the offensive and defensive play sheets 40 and 42, respectively. Slot 32 is adapted to slidably receive master play sheet 44 which can be progressively longitudinally moved therethrough.

Figure 5:
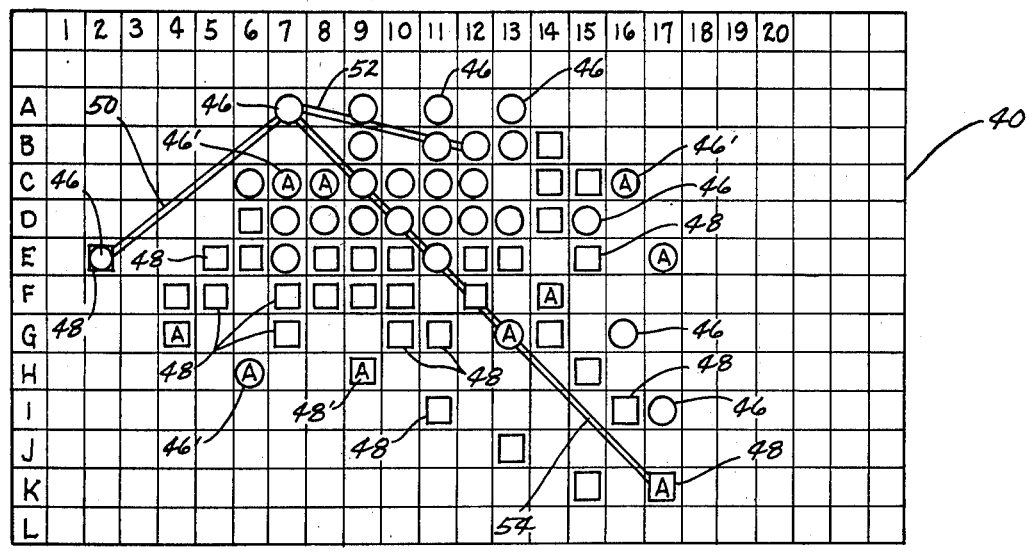
FIG. 5 is a plan view of an offensive team sheet.
Figure 6:
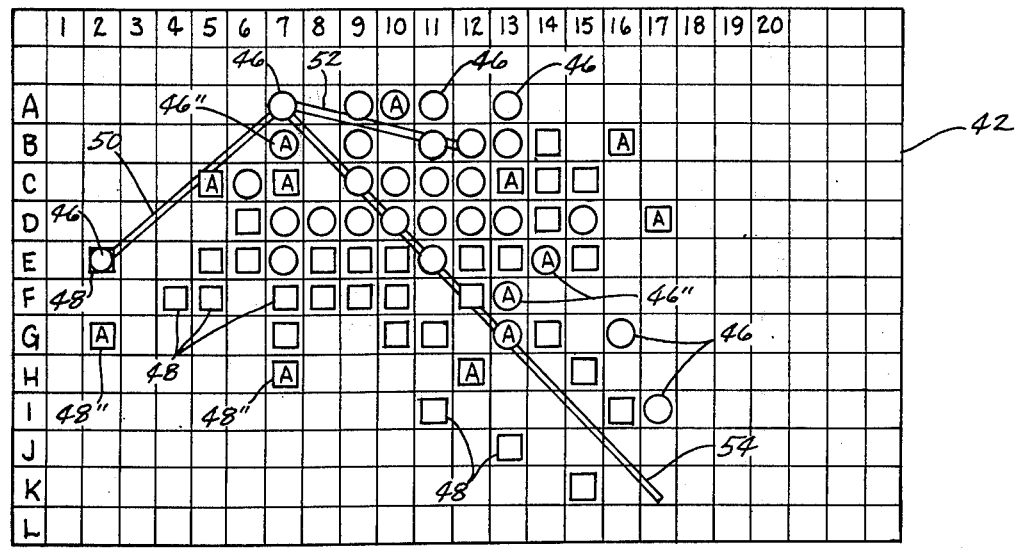
FIG. 6 is a plan view of a defensive team sheet.

Offensive play sheet (or battery) 40 is shown in FIG. 5. For illustrative purposes, it shows a plurality of offensive positions shown by circles 46 which represent all the positions occupied at three different stages in a given offensive play to be described hereinafter. Ordinarily, the play sheet 40 would also have a plurality of other offensive positions 46' which could be operative if a play sequence other than that depicted on master play sheet 44 was used. Similarly, offensive sheet 40 has a plurality of defensive positions shown by squares 48 which represent all the positions occupied at three different stages of the offensive play to be described hereafter. Sheet 40 typically will also have other defensive positions 48' which could be operative if a play sequence other than that depicted on master play sheet 44 was used. The play sheets 40, 42, and 44 have been shown on a grid system to facilitate illustration and description of the invention. In practice, this grid system is not required. Further, in practice, the play sheets can be comprised of a non-translucent plastic with the player positions being comprised of open apertures or translucent or transparent plastic. The offensive and defensive positions are preferably comprised of translucent plastic of different colors.

The defensive play sheet (or battery) 42 is similar to offensive sheet 40 in that it also has a plurality of offensive positions 46 which will register with the positions 46 on play sheet 40. It also has a plurality of offensive positions 46" which could be operative if a different master play sheet was used. The positions 46" are not necessarily complimentary to all the positions 46' on sheet 40. Defensive play sheet 42 has a plurality of defensive positions 48 which can register with positions 48 on sheet 40 when the two sheets are superimposed over each other. Alternate defensive positions 48" may be operative if a different master play sheet is used. The positions 48" do not necessarily coincide with the positions 48' on sheet 40.

Open longitudinal segments 50, 52 and 54 appear on each of the sheets 40 and 42 to represent the direction of forward passes which are possible with the offensive play.

The offensive and defensive sheets 40 and 42 are preferably coordinated to the extent that the offensive sheet will depict several plays to the right, with other offensive sheets depicting other plays to the left or the like. The direction of play is announced by the person directing the offensive team as the offensive sheet is placed in the device. This enables the person directing the defensive team to insert a defensive sheet which is designed generally to defense a play in the same direction.

Thus, when an offensive sheet is placed in the device and announced as a play to the right, and a compatible defensive sheet is placed in superimposed position, the persons directing the strategy for the offensive and defensive teams must await the master play sheet to determine which of several possible plays will materialize. As indicated, both the offensive and defensive sheets are pre-programmed to have compatible offensive and defensive positions to accommodate several possible play situations which might be called for by the master play sheet.

After the offensive and defensive play sheets 40 and 42 have been placed in the compartments 34 and 36, respectively, light element 31 is turned on as a master play sheet 44 is progressively and intermittently moved through slot 32. Play sheet 44 is comprised of the same general construction as sheets 40 and 42. A first segment 44A of offensive positions 46A and defensive positions 48A are shown, and are limited to the precise number of players involved. These positions 46A and 48A represent the starting positions of the play, and positions 46A and 48A register with a similar number of registered positions 46 and 48 on offensive and defensive sheets 40 and 42. The player positions on master play sheet 44 are preferably open or transparent apertures.

Segment 44B on master play sheet 44 represents the positions 46B and 48B of the offensive and defensive teams, respectively, as the play starts to develop. Again, these positions 46B and 48B will register with an equal number of offensive and defensive player positions 46 and 48, respectively, on the superimposed offensive and defensive play sheets.

Figure 7:
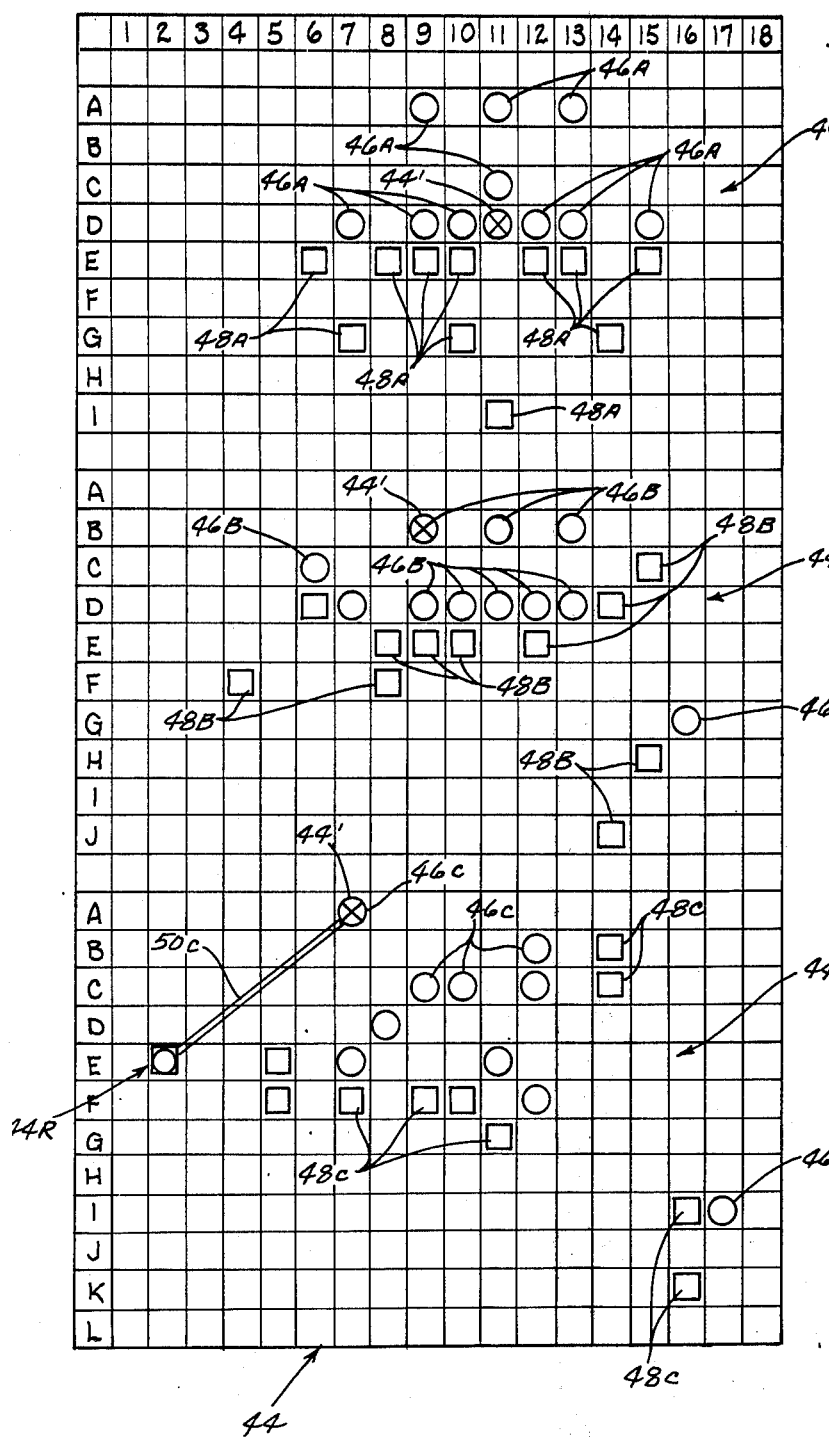
FIG. 7 is a plan view of a master play sheet.

Segment 44C on master play sheet 44 depicts the final sequence of the play in progress. The offensive positions are designated by the numerals 46C and the defensive positions by the numerals 48C. An open longitudinal segment 50C aligns itself with the aligned segments 50 in sheets 40 and 42, as the master sheet 44 is moved to this third position. The light emitted through the registering segments 50 and 50C indicate that a forward pass has been thrown. If the offensive positions are colored as translucent red, and the defensive positions are colored as translucent yellow, a resulting orange light will be observed at the position 44R in segment 44C (FIG. 7) if both an offensive and defensive player were present at the end of the forward pass segment 50C. This would indicate that the pass was completed by the offensive player who was immediately tackled. Ordinarily, the presence of both the offensive player carrying the ball and a defensive player in the same position would signal the end of the play. If only an offensive position is indicated at the end of a pass segment, the pass will have been completed and a subsequent segment on master sheet 44 will indicate the fate of the pass receiver. A pass interception would be indicated if only a defensive position appeared at the end of a pass segment. An incompleted pass is indicated if no player position appears at the end of a pass segment. The position of the ball can be indicated by a special indicia as indicated at 44' in FIG. 7.

The master play sheet can be progressively moved to a registering position with the superimposed offensive and defensive play sheets 40 and 42 by manual, electrical or mechanical means without departing from the invention. As the play segments 44A, 44B and 44C are progressively moved into registering positions with the offensive and defensive play sheets, the changing positions of the team members can be visually observed as the play develops.

While a mechanical means has been disclosed, the same concept of this invention can be achieved by imposing the team positions and master play sheet positions on overlaying electronic or computer circuits whereby the intermittent and sequential player positions during a given play can be visually observed.

The compartment 20 can be moved laterally on plate 30, and the sub-structure 18 can be moved longitudinally on plate 14 to move appropriately the play on plate 14 as the above process of running plays is repeated with different offensive and defensive sheets, and with different play segments on the master play sheet.

From the foregoing, it is seen that this invention will accomplish at least all of its objectives.

What is claimed is:

1. A method of observing sequentially player positions in predetermined game plays, comprising,
    selecting a first battery of a plurality of simulated offensive and defensive player positions for an offensive team for an offensive play,
    selecting a second battery of a plurality of simulated offensive and defensive player positions for a defensive team to defend said offensive play wherein at least some of the offensive and defensive player positions of said batteries are identical,
    providing a plurality of predetermined master play segments utilizing only some of said identical simulated player positions from said offensive and defensive teams wherein said batteries and said master play segments are opaque play sheets with translucent apertures for player positions,
    and intermittently and sequentially comparing by superimposing over each other to register the player positions which are common to all three sheets said master play segments in a visual medium with said first and second batteries so that the changing player positions of the offensive and defensive teams throughout the duration of each play can be visually observed.

2. The method of claim 1 wherein said batteries include common player positions for a plurality of different player positions, and said master play segments include a plurality of segments depicting progressive player positions as a given play evolves, said batteries are moved into superimposed condition so that said common player positions register, and said master player segments are sequentially and intermittently moved over said superimposed batteries to sequentially register with at least some of the common player positions of said batteries.

3. The method of claim 2 wherein all of the player positions of said master player segments register with a like number of player positions of said batteries.

4. A device for sequentially observing player positions in predetermined game plays, comprising,
    a support means for superimposing offense, defense, and master play sheets,
    offense, defense, and master play sheets superimposed on said said support means, said play sheets being opaque and each having a plurality of translucent offensive and defensive player positions, each of said offense and defense sheets having a plurality of common player positions for a plurality of different player positions, said master play sheets including a plurality of play segments comprising a plurality of player positions, all of the player positions of each segment of said master play sheet being adapted to register with a like number of common player positions of said offense and defense play sheets.

5. The device of claim 4 wherein said master play sheet is longitudinally movable with respect to said offense and defense sheets.

6. The device of claim 4 wherein said player positions on said play sheets are subject to the passing of light therethrough.

7. The device of claim 6 wherein a light source is provided to pass light through registering player positions in said sheets.

8. The device of claim 8 wherein said support means is mounted underneath a simulated translucent playing field plate wherein the player positions are visible through said plate.

9. The device of claim 7 wherein means are provided on said support means for moving said support means longitudinally and laterally with respect to said plate.

* * * * *